Patented Nov. 2, 1937

2,097,726

UNITED STATES PATENT OFFICE 2,097,726

PROCESS FOR THE MANUFACTURE OF SULPHONIC ACIDS FROM ARYL ETHYLENES AND THE PRODUCTS THEREOF

Hans Grotowsky, Krefeld-Uerdingen, Germany, assignor to I. G. Farbenindustrie Aktiengesellschaft, Frankfort-on-the-Main, Germany No Drawing. Application August 29, 1934, Serial No. 742,013. In Germany September 22, 1933

18 Claims. (Cl. 260—159)

The present invention has for its object a process for the manufacture of sulphonic acids by causing chlorosulphonic acid to react with aryl ethylenes generally in the presence of solvents and the products so produced.

It is known that sulphuric acid causes styrene and other phenyl substituted aromatic compounds to polymerize.

As a result of investigation and research and in accordance with the present invention, in contradistinction to sulphuric acid chlorosulfonic acid can be caused to react in a smooth manner with aromatic compounds containing a vinyl group in an open or closed side chain, thus for example, with styrene without polymerization being effected. In general the reaction should be carried out in a solvent. In the resulting sulphonic acids, such as for example in 1-phenyl-1-chloroethane-2-sulphonic acid obtainable by the addition of chlorosulphonic acid to styrene the chlorine atom is readily replaceable. In general, even by pouring the reaction mixture into water, replacement of the chlorine by a hydroxyl group takes place. Thus for example, from the 1-phenyl-1-chloroethane-2-sulphonic acid indicated above 1-phenyl-1-hydroxyethane-2-sulphonic acid is obtained. Moreover, the chlorine atom or the hydroxyl group can likewise be replaced readily by other residues.

It is not necessary to isolate the additive compound of the chlorosulphonic acid in order to carry out the replacement of the chlorine atom. It is quite feasible to use the reaction mixture as such for the further working up, especially when employing a solvent.

As solvents for carrying out the reaction ethers, such as diethyl ether, dipropyl ether, ethyl propyl ether, dibutyl ether, dibenzyl ether and the like are suitable.

The pressure and temperature during the reaction may vary according to the conditions. Generally the reaction is performed in a temperature range of about 0° to about room temperature at ordinary pressure. But also higher temperatures may be employed. In this case, the pressure and temperature conditions during the reaction are to be selected in such a manner that the solvent does not boil off. Accordingly when working under ordinary pressure the boiling point of the solvent must not be exceeded. When employing higher temperatures the reaction must be carried out in closed vessels under pressure. In this connection the upper limits of pressure and temperature merely depend upon the resistivity of the material of which the vessel is constructed and the decomposition temperature of the reacting ingredients.

Among the ethylenes which are suitable for the purpose of the present invention the following may be mentioned: styrene, vinyl naphthalene, acenaphthylene, safrol, isosafrol, cumarone and indene. Instead of these ethylenes, substitution products thereof can be employed, as for example, those compounds obtainable by the introduction into the ethylenes of a halogen atom, such as for example, a chlorine or a bromine atom, or a nitro group, a sulphonic acid group, an alkyl group, such as for example a methyl-, ethyl-, propyl-, or butyl-group, furthermore an aralkyl group, such as for example a benzyl group or several of the above mentioned atoms or groups.

The invention is illustrated, but not restricted, by the following examples; the parts being by weight.

Example 1

180 parts by weight of chlorosulphonic acid are mixed with 180 parts by weight of diethyl ether with stirring and cooling to 10° C.; 150 parts by weight of styrene are added to this mixture in the course of 15 minutes, the temperature being kept at about 10° to about 15° C. After a short time the addition is complete. An ethereal solution of the additive compound of chlorosulphonic acid and styrene is thus obtained, which can be employed directly for the chemical reactions. By pouring the solution on to ice (350 parts by weight), a compound formed as a by-product separates in small quantity in well defined crystals. This compound is probably a sulphone of the following structure:

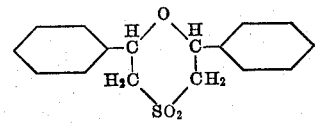

By salting out the filtrate with sodium chloride or sodium sulphate, if necessary after previous neutralization with caustic soda lye, the sodium salt of the phenyl hydroxy ethane sulphonic acid is obtained in a yield of about 270 parts by weight. Analysis of this salt gave the following values:

43.1% C, 4.1% H, 14.1% S (calculated for $C_8H_9OSO_3Na$ 42.86% C, 4.0% H, 14.29% S).

Accordingly the primarily formed additive compound of chlorosulphonic acid and styrene obtainable in the ethereal solution possesses the formula C₈H₈ClSO₃H.

The following indicates the probable course of the reaction by which the additive compounds are produced:

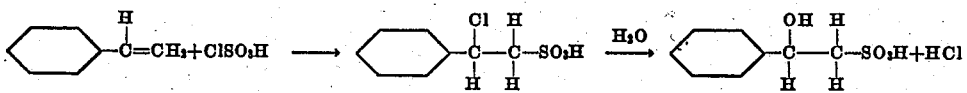

Similarly as with styrene the addition can be carried out with the derivatives thereof substituted by halogen or alkyl groups.

Example 2

600 parts by weight of ether are gradually added to 600 parts by weight of chlorosulphonic acid with stirring and cooling to about 0° C. 800 parts by weight of safrol are then added, the temperature being kept at about 10° C. The reaction mixture is stirred for several hours and then poured on to 200 parts by weight of ice, separated from small quantities of oil by extraction with ether, carefully neutralized and the sodium salt of the hydroxy sulphonic acid is then salted out with solid common salt. The yield of the sodium salt of the hydroxy sulphonic acid is almost quantitative. This salt probably has the formula:

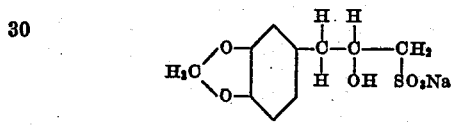

Example 3

In a corresponding manner to that described in Example 2 by employing 600 parts by weight of chlorosulphonic acid, 600 parts by weight of ether and 800 parts by weight of isosafrol, the sodium salt of the hydroxy sulphonic acid corresponding to the additive compound of chlorosulphonic acid and isosafrol can be obtained in almost quantitative yield.

Example 4

180 parts by weight of chlorosulphonic acid are mixed with 180 parts by weight of diethyl ether with stirring and cooling to about 5° C.; 175 parts by weight of cumarone are added to this mixture in the course of about half an hour. The reaction mixture is then stirred for several hours, the temperature being kept at about 10° C. An ethereal solution of the addition product of chlorosulphonic acid and cumarone is thus obtained, which can be employed directly for chemical reactions. By pouring the solution on to 350 parts by weight of ice, extracting with ether to remove unchanged cumarone and neutralizing with caustic soda lye, the sodium salt of the hydroxy sulphonic acid corresponding to the additive compound of chlorosulphonic acid and cumarone is obtained after evaporating the resulting solution to dryness in vacuo. This sodium salt can also be obtained by salting out the solution with solid common salt. The analysis of this salt gave a sulphur content of 13.1% contrasted with a calculated value of 13.4% for a compound of the composition C₈H₇O₂SO₃Na. The molecular weight of the salt was determined as 230 contrasted with a calculated value of 238 for a compound of the composition mentioned before.

Accordingly the primarily formed additive compound of chlorosulphonic acid and cumarone obtainable in the ethereal solution possesses the formula C₈H₆ClOSO₃H.

Example 5

190 parts by weight of chlorosulphonic acid are allowed to drop into the same quantity of diethyl ether in the course of about 2 hours. To this solution are then added likewise with ice cooling, 160 parts by weight of indene in the course of about ¾ hour, the temperature being kept at about 10° C. An ethereal solution of the additive compound of chlorosulphonic acid and indene is thus obtained, which can be employed directly for the further reactions. By pouring the solution on to 350 parts by weight of ice, filtering and extracting with ether, the hydroxy sulphonic acid derivative of indene can be salted out from the aqueous solution by means of solid common salt; the yield of the sodium salt of indene sulphonic acid amounts to about 140 parts by weight. The analysis of this salt gives the following value:

45.9% C, 3.6% H, 13.6% S (calculated for the compound of composition C₉H₉OSO₃Na 45.8% C, 3.8% H, 13.6% S).

Accordingly, the primarily formed additive compound of chlorosulphonic acid and indene obtainable in the ethereal solution possesses the formula C₉H₈ClSO₃H.

It is to be borne in mind that applicant does not wish to be restricted to the theory of the formation of the products as exemplified by the foregoing reaction, nor to the theory of the structure of the end products as exemplified by the foregoing structure formulae.

I claim:
1. Process which comprises reacting with chlorosulphonic acid on an aromatic compound, containing a vinyl group in an open side chain in the presence of an ether.
2. Process which comprises reacting with chlorosulphonic acid on an aromatic compound, containing a vinyl group in an open side chain in the presence of an aliphatic ether.
3. Process which comprises reacting with chlorosulphonic acid on styrene in the presence of diethyl ether at a temperature of about 10° C.
4. Process which comprises reacting with chlorosulphonic acid on an aromatic compound, containing a vinylene group in a closed side chain in the presence of an ether.
5. Process which comprises reacting with chlorosulphonic acid on an aromatic compound, containing a vinylene group in a closed side chain in the presence of an aliphatic ether.
6. Process which comprises reacting with chlorosulphonic acid on cumarone in the presence of diethyl ether at a temperature of about 10° C.
7. Process which comprises reacting with chlorosulphonic acid on indene in the presence of diethyl ether at a temperature of about 10° C.
8. An ethereal solution of an additive compound of chlorosulphonic acid to an aromatic compound, containing a vinyl group in an open side chain.
9. An ethereal solution of an additive compound of chlorosulphonic acid to styrene, said product possessing the formula C₈H₈ClSO₃H.
10. An ethereal solution of an additive compound of chlorosulphonic acid to an aromatic compound, containing a vinylene group in a closed side chain.

11. An ethereal solution of an additive compound of chlorosulphonic acid to cumarone, said product possessing the formula $C_8H_6OClSO_3H$.

12. An ethereal solution of an additive compound of chlorosulphonic acid to indene, said product possessing the formula $C_9H_8ClSO_3H$.

13. Process which comprises reacting with chlorosulphonic acid on material selected from the group consisting of aromatic compounds containing a vinyl group in an open side chain, aromatic compounds containing a vinylene group in an open side chain and aromatic compounds containing a vinylene group in a closed side chain in the presence of an ether.

14. An ethereal solution of an additive compound of chlorosulphonic acid to material selected from the group consisting of aromatic compounds containing a vinyl group in an open side chain, aromatic compounds containing a vinylene group in an open side chain and aromatic compounds containing a vinylene group in a closed side chain.

15. An additive compound of chlorosulphonic acid with an aromatic compound containing an aliphatic vinyl group in a side chain thereof.

16. Process which comprises reacting with chlorosulphonic acid on an organic compound comprising an aliphatic radical containing a double bond, the double bond occurring between two carbon atoms, one of which is immediately connected to an aromatic nucleus, in the presence of an ether.

17. An ethereal solution of an additive compound of chlorosulphonic acid to an organic compound comprising an aliphatic radical containing a double bond, the double bond occurring between two carbon atoms, one of which is immediately connected with an aromatic nucleus.

18. An additive compound of chlorosulphonic acid with an organic compound comprising an aliphatic radical containing a double bond, the double bond occurring between two carbon atoms, one of which is immediately connected with an aromatic nucleus.

HANS GROTOWSKY.